Figure 1:
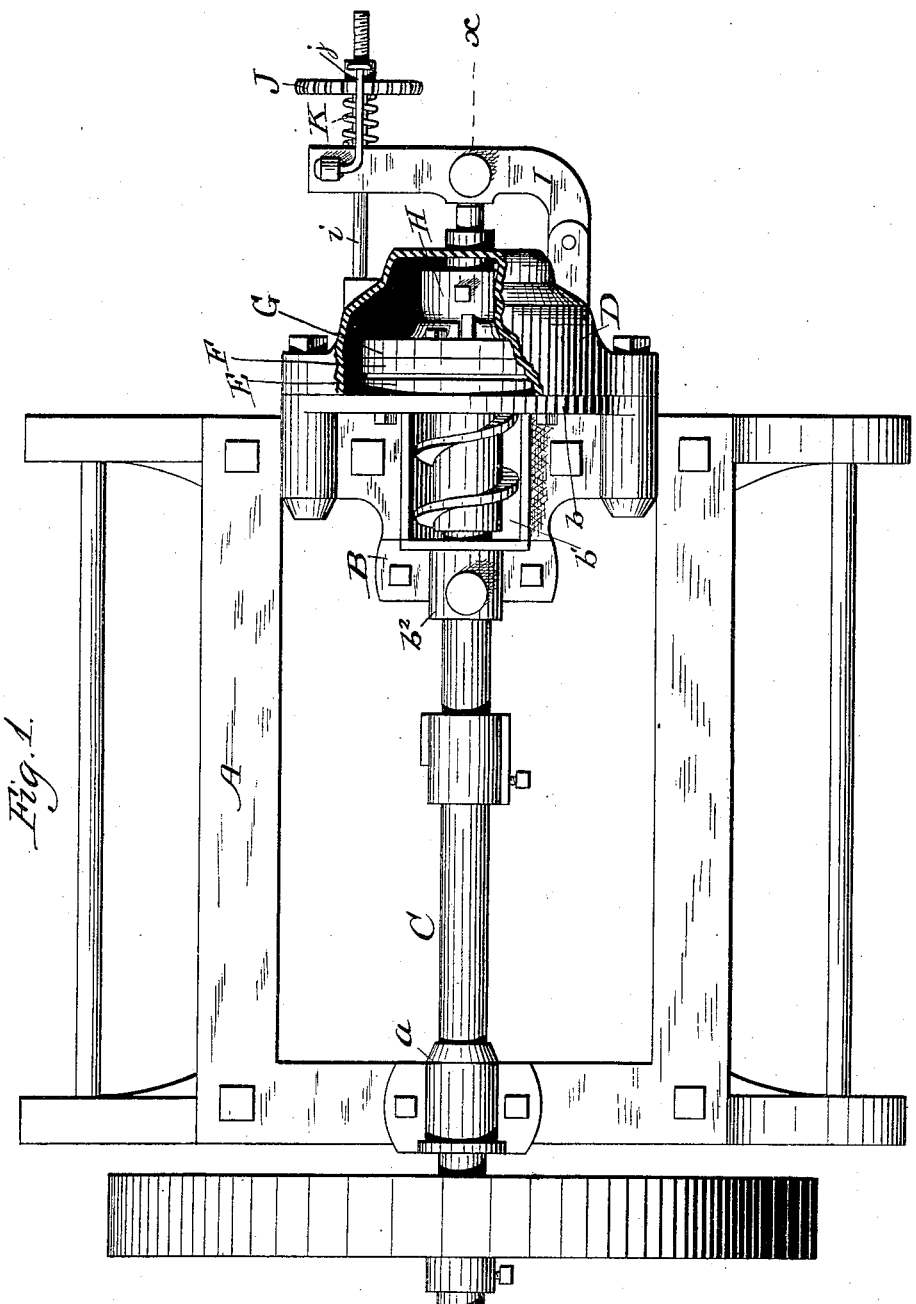

(No Model.) 2 Sheets—Sheet 1.

T. W. BEAL.
GRINDING MILL.

No. 266,340. Patented Oct. 24, 1882.

Witnesses
F. B. Townsend
D. H. Fletcher

Inventor
Thomas W. Beal
By Hill & Dixon,
His Attys.

(No Model.) 2 Sheets—Sheet 2.
T. W. BEAL.
GRINDING MILL.
No. 266,340. Patented Oct. 24, 1882.
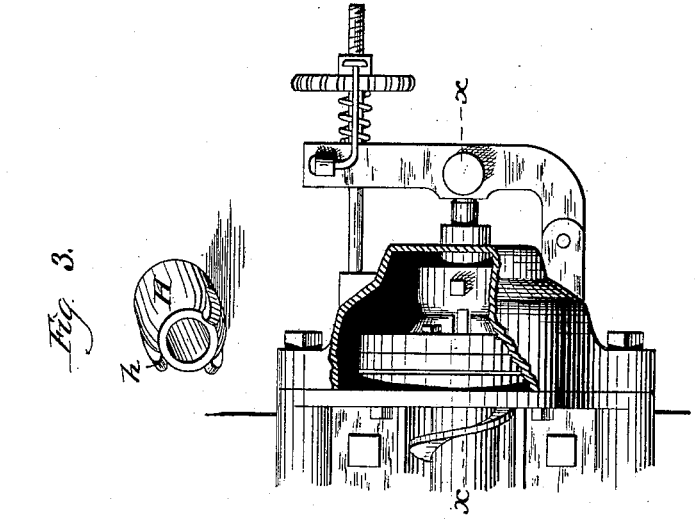
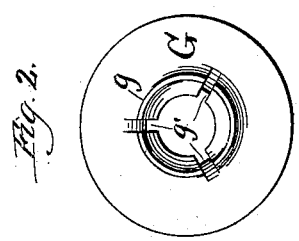
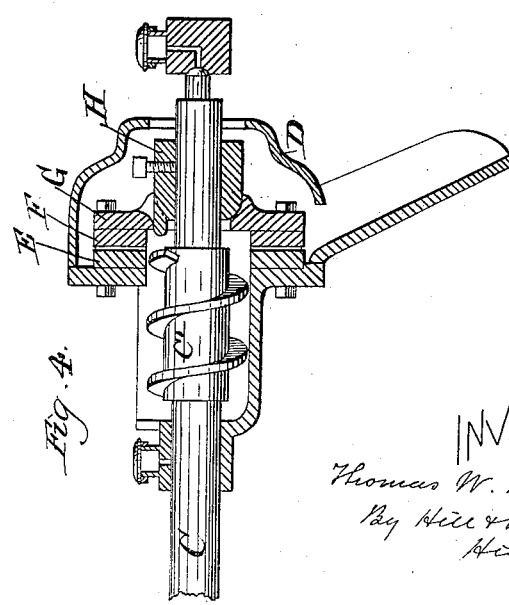
Witnesses
F. B. Townsend
D. H. Fletcher
Inventor
Thomas W. Beal,
By Hill & Dixon,
His Attys.

UNITED STATES PATENT OFFICE.

THOMAS W. BEAL, OF SANDWICH, ILLINOIS, ASSIGNOR TO THE SANDWICH ENTERPRISE COMPANY, OF SAME PLACE.

GRINDING-MILL.

SPECIFICATION forming part of Letters Patent No. 266,340, dated October 24, 1882.

Application filed April 24, 1882. (No model.)

*To all whom it may concern:*

Be it known that I, THOMAS W. BEAL, of Sandwich, Illinois, have invented a new and useful Improvement in Grinding-Mills, of which the following is a description, reference being had to the accompanying drawings, in which—

Figure 1 is a plan view of a grinding-mill embodying my improvements. Fig. 2 is a plan view of my improved grinding-plate, showing the socket in the back of the same. Fig. 3 is a perspective view of the sleeve or thimble forming the ball which engages in the socket in the grinding-plate; and Fig. 4 is a longitudinal sectional view taken through the line $x \, x$, Fig. 1. Fig. 5 is a detail plan view of a portion of Fig. 1.

Like letters of reference indicate like parts in the different figures.

The object of my invention is to provide a simple, cheap, and effective device whereby the burrs in a grinding-mill are so mounted as to permit an automatic lateral adjustment of their grinding-surfaces to each other, to prevent an unequal wear of the burrs and prevent the burrs or rings from being injured or broken in case the same are brought in contact with any hard and unyielding foreign substance—such as stones, nails, or the like—and which may chance to become mixed with the material to be ground, and also to prevent the clogging of the mill.

In the drawings, A represents the framework of the mill, which may be the usual or any appropriate form of construction. The hopper is stationed upon the top of the frame, but is not shown in the drawings.

The usual metallic plate or casting, B, is attached rigidly upon the frame A at one end, and is provided with an upright flange, $b$, a trough, $b'$, and a box, $b^2$. The shaft C is mounted longitudinally upon the frame, and supported in the boxes $b^2$ and $a$, and provided with the usual band-wheel or gearing, $c$. The usual conveyer, $c'$, is attached rigidly to the shaft within the trough $b'$, and feeds the grain to the grinding-plates, which are inclosed within the shell D, which is bolted upon the outside of the flange-plate B.

The stationary grinding-plate E is rigidly attached to the flange-plate B in the usual manner. The running burr F is also attached rigidly to the running plate G, though, if preferred, the burr F may be formed upon the running plate G. The running plate G is provided upon its rear side with an annular projection, $g$, hollowed out so as to form a socket, as shown in detail in Fig. 2, and one or more slots or notches, $g'$, are cut through this annular projection.

A sleeve or thimble, H, (shown in detail in Fig. 3,) is attached rigidly to the shaft C, near its outer end. The inner end of the thimble H is rounded, so as to have the contour of a ball, fitting within the socket $g$ upon the running plate G, thus forming a ball-and-socket joint.

The thimble H is also provided at its inner end with one or more projections, $h$, which fit within the slots or notches $g'$ in the running plate G, so that the revolution of the shaft carries with it said running plate G.

In the preferable construction the slots $g'$ are somewhat longer than the bosses or projections $h$, to allow a lateral freedom of movement. The shaft C extends through the shell D and abuts against the arm I, which is hinged upon one side of the cap D, and extends across and is slipped over a rod, $i$, attached to the other side of the cap D. The arm I is passed over the rod $i$, which falls within a slot on the end of the arm I, and a flange-nut, J, is screwed upon the outer end of the rod $i$, a coiled or other spring, K, being interposed between the arm I and the nut J. The nut J is prevented from loosening by slipping one end of the pivoted rod $j$ into one of the notches upon the flange of the nut. The shaft C is mounted in such manner as to allow the requisite end-play, and the spring K by its tension holds the running plate G and its burr F in contact with the burr E.

The construction may be varied in its details. Thus, for example, the bosses $h$, instead of being formed upon the thimble H, may be made to project from the socket $g$ upon the rear of the running plate G and fit within corresponding slots or notches in the thimble H; or the ball of the joint may be cast in annular form upon the back of the running plate G and the thimble H enlarged and formed with a corresponding socket, bosses being placed upon one fitting within slots upon the other; but the form illustrated is much the simpler and more compact form of construction.

Important advantages are secured by mounting the running plate to the ball-and-socket joint instead of the stationary plate or burr, as it is necessary to good grinding that the stationary burr, which effects the grinding by its resistance to the moving parts of the mill, should be absolutely stable and fixed in position. The attempt to overcome this difficulty in a measure by bolting the stationary jointed plate to the frame of the mill and interposing rubber between the stationary plate and the frame is open to serious practical objections, as the stability of the stationary plate is still impaired and the rubber soon wears out under the heavy strain and constant movement. Moreover, such bolts limit the freedom of movement within the ball-and-socket joint, while by the mounting of the running plate with a ball-and-socket joint provided with the lugs and slots, as above set forth, there is practically secured that perfect freedom of movement which is essential to perfect grinding, and without impairing the stability of the fixed or stationary portion of the mill.

It will be observed that the shaft C is supported in fixed bearings, and that its outer end abuts directly against the arm I without any lateral play thereon. This construction secures much more uniform and better grinding than if the shaft terminated within the running plate G, and a projection or boss from the latter extended through a larger hole in the shell D and abutted against the arm I, thus giving a lateral movement and play to the running plate G by the lateral movement of the end of such boss or projection against the arm I. This latter construction produces a constant "wabbling" of the grinding-plate under the ordinary motion of the shaft, which prevents uniform grinding of the grain, and is liable to serious mechanical objections, causing the burrs to wear unequally upon their surfaces. By mounting the running plate upon the shaft with a ball-and-socket joint and extending the shaft so that its end abuts directly against the arm I under its spring-tension, as in my construction, these difficulties are wholly overcome, and a mill thus constructed grinds the grain uniformly without clogging or choking, and any hard foreign substance accidentally introduced passes through without injury to the burrs or stopping the grinding, as shown by actual and long-continued practical tests.

Having thus described my invention, what I claim, and desire to secure by Letters Patent, is—

1. In a grinding-mill, the combination of a stationary grinding-plate, a shaft, a running grinding-plate mounted upon the shaft with a ball-and-socket joint, substantially as described, and a spring exerting its tension against the shaft and operating to press the grinding-plates together, substantially as and for the purpose set forth.

2. In a grinding-mill, the combination of a stationary grinding-plate, a shaft, a running grinding-plate mounted upon the shaft with a ball-and-socket joint, and a hinged arm under spring-tension abutting against the outer end of the shaft and operating to press the grinding-plates together, substantially as described.

THOMAS W. BEAL.

Witnesses:
WM. RODLEY,
S. PARK SEDGWICK.